Dec. 1, 1942.  L. OLDFIELD  2,304,054
INTERNAL COMBUSTION ENGINE
Filed March 28, 1940
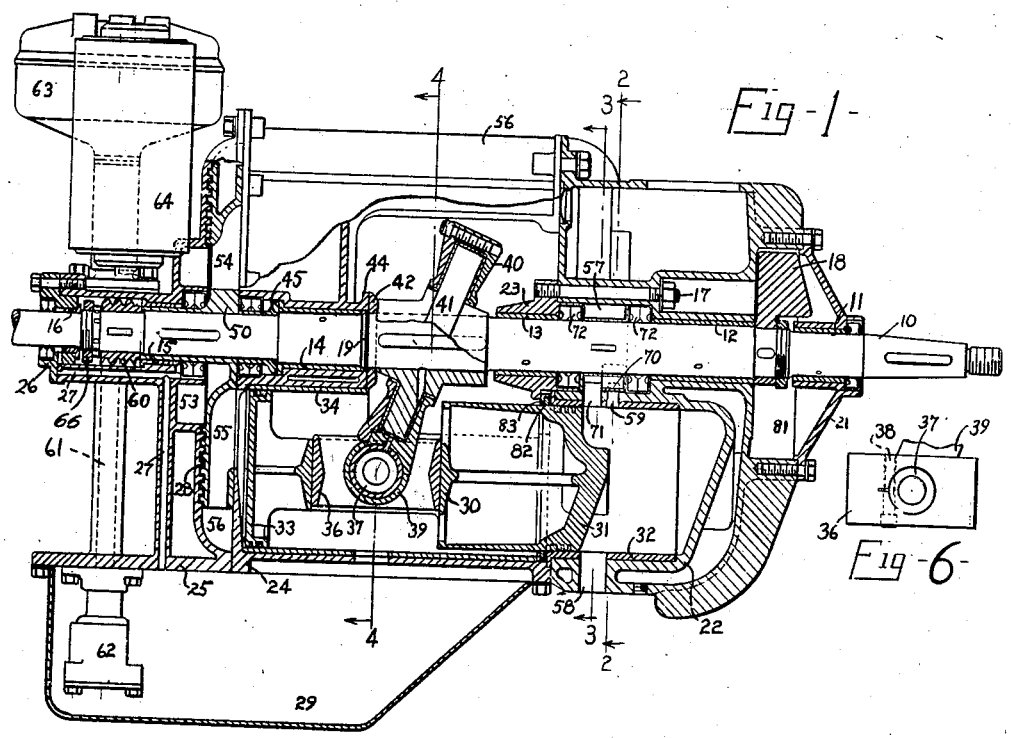
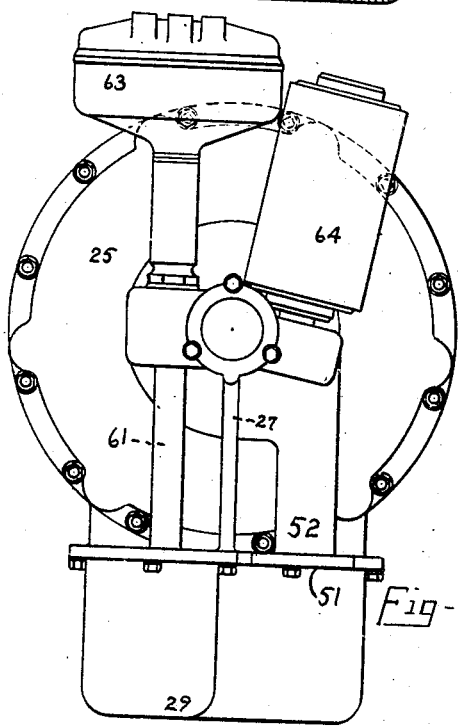
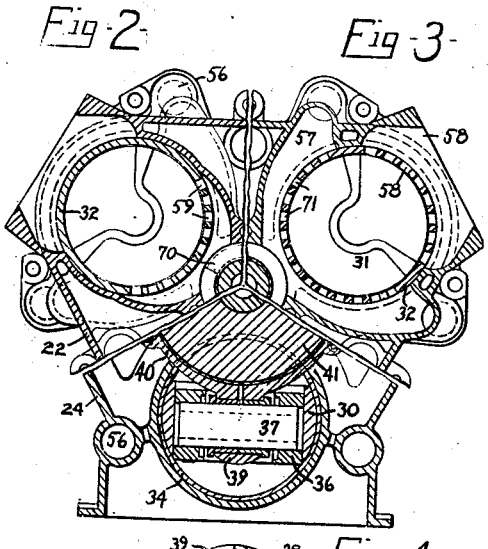
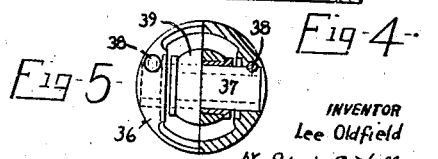
INVENTOR
Lee Oldfield
by Edwin S. Hall ATTY.

Patented Dec. 1, 1942

2,304,054

UNITED STATES PATENT OFFICE 2,304,054

INTERNAL COMBUSTION ENGINE

Lee Oldfield, Brown Township, Morgan County, Ind.

Application March 28, 1940, Serial No. 326,356

4 Claims. (Cl. 123—58)

This invention relates to internal combustion engines of the barrel type having cylinders parallel to the shaft. An object of the invention is to provide an improved supercharged two-stroke engine of simple construction, low weight, and low cost.

Another object is to provide a two-stroke engine having double-ended piston members operably connected to the engine shaft by a wabbler mechanism, the piston members being operable in power cylinders at one end of the engine and in compressor or blower cylinders at the other end, the bore of the compressor cylinders being larger than that of the power cylinders to provide the desired amount of supercharge, and the larger diameter of the compressor pistons being carried forward to include the crosshead portions of the piston members to permit larger bearing areas in the operable connections between the piston members and the wabbler.

Another object is to provide any desired amount of supercharge not only by making the compressor of larger displacement than the power cylinders, but also by delaying the effective opening of the inlet ports in the power cylinders until after the exhaust ports have opened, while providing that the inlet ports may remain open after the exhaust ports have closed.

Another object is to attain high volumetric efficiency by providing for free flow of the working medium thru the compressor, the compressor valve being of disc type rotating with the shaft, with large ports and fast opening and closing thereof, the valve also contributing to rapid movement of the working medium by the centrifugal effect of the valve passages thereupon. Another object is to provide for efficient operation of the compressor valve by avoiding the use of sealing devices in the compressor ports or of other frictional contact of the valve with the compressor cylinder head or with the valve casing, yet with negligible leakage of the working medium; this is accomplished by using the valve as one of the agencies locating the valve and the engine shaft axially relative to the compressor cylinders, the thrust bearing faces being lubricated, suitable means being provided to prevent the lubricant from entering the valve chamber; the valve runs with fixed small clearances relative to the compressor cylinder head and valve casing, with labyrinth packing also where it may assist in preventing flow of the working medium from the discharge side of the valve to the inlet side. Another object is to use static unbalance in the valve itself as one of a pair of counterweights for producing the centrifugal couple opposing the piston inertia couple to put the engine in dynamic balance.

Another object is to provide means for minimizing leakage of working medium and oil between the ports in the walls of the power cylinders and the wabbler casing, without adding so much to the length and weight of the engine as required by an oil ring on the piston skirt adapted to remain always below ports. This is accomplished by providing contracting scraper rings at the mouths of the power cylinders, operable upon the piston skirts, and provided with small axial clearance in their retaining rings so that they may have a valve action in scraping oil and returning it to the wabbler casing.

Other objects are to improve certain details of the wabbler mechanism, particularly in the construction of the wristpin and wristpin carrier, and in the wabbler construction and the wabbler bearing.

The invention and these and other objects thereof may be more completely understood from the following description in connection with the drawing in which:

Fig. 1 is a longitudinal section of the engine;

Fig. 2 is a transverse section taken on the line 2—2 of Fig. 1;

Fig. 3 is a transverse section taken on the line 3—3 of Fig. 1;

Fig. 4 is a transverse section taken on the line 4—4 of Fig. 1;

Fig. 5 is a radial view, partly in section, of a wabbler arm assembly of Figs. 1 and 4;

Fig. 6 is a side view of a wabbler arm assembly; and

Fig. 7 is a rear view of the engine showing the arrangement of some of the accessories.

Details of the construction and operation of the invention can be understood by reference to the drawing. Shaft 10 is supported for rotation in journal bearing bushings 11, 12, 13, 14, 15, and 16. Bearing 11 is carried by cover 21 bolted to cylinder block 22 and housing the front counterweight 18 fixed on shaft 10. Bearing 12 is positioned in cylinder block 22. Bearing 13 is in a separate piece 23 bolted to cylinder block 22 by bolts 17. Bearing 14 is supported in compressor cylinder block 24. Bearing 15 is carried in compressor cover 25, and bearing 16, in cap 26.

Power cylinder block 22 and compressor cylinder block 24 comprise the principal frame members of the engine, and their respective cylinders are lined with sleeves 32 and 34, the bore of the latter being somewhat larger than that of the former. Operable in each pair of sleeves 32 and 34 is a double-ended piston member 30 having a power piston 31 and a compressor piston 33, the the central crosshead portion of the piston member 30 having substantially the same diameter as that of compressor piston 33, larger than the diameter of power piston 31.

A cylindrical bore in the crosshead portion of each piston member 30 operably receives wristpin carrier 36 in which wristpin 37 is clamped by clamp screws 38, screws 38 passing thru notches in wristpin 37 preventing its movement even in the event of failure of the clamping action. Wabbler 40 has arms 39, each of which is operable upon a wristpin 37. Wabbler 40 is operably mounted on swashplate 41 keyed to shaft 10 and a press fit thereon, with thrust collar 42 locked between shoulder 19 of shaft 10 and the hub of swashplate 41.

Thrust collar 42, operably engaging flange 44 of compressor cylinder block 24 prevents axial movement of shaft 10 in the rearward direction, and thrust collar 45, operably engaging the flange of bearing 14, prevents axial movement of shaft 10 in the forward direction. Abutting the sleeve portion of thrust collar 45 is compressor valve 50, keyed on shaft 10; helical gear 60, also keyed on shaft 10, is held against the hub of disc valve 50 by nut 66 serving to hold thrust collar 45, compressor valve 50, and helical gear 60 locked together on shaft 10.

The axial position of shaft 10 and valve 50 being controlled by thrust collars 42 and 45 relative to the compressor cylinder block 24, valve 50 may run with a fixed close clearance relative to the head of compressor cylinder block 24, so that sealing rings need not be used. To prevent leakage between valve 50 and cover 25, labyrinth seals 28 in concentric rings are provided.

The carburetor (not shown) may be attached to flange 51 of intake pipe 52, both integral with cover 25. Intake passage 53 delivers the mixture thru intake ports 54 in valve 50 to the compressor cylinders, from which it is discharged thru discharge port 55 in valve 50 thru conduits 56 to the port zone 57 of power cylinder block 22. (In Fig. 1, valve 50 is shown about 90 degrees out of its correctly timed position relative to pistons 33, in order to show the inlet and discharge passages, 54 and 55, in the valve.)

While exhaust ports 58 are opening, supercharge ports 59 are closed by delay valve 70, keyed on shaft 10, and so timed as to open supercharge ports 59 to port zone 57 as piston 31 reaches bottom center. Intake ports 71 are opened by piston 31 in the usual manner, after the piston has opened exhaust ports 58, but supercharge ports 59 remain open after exhaust ports 58 have been closed by piston 31. Seals 72 are provided on both sides of delay valve 70 to prevent leakage of oil from bearings 12 and 13 into the intake passages.

Helical gear 60 drives a mating gear on vertical shaft 61 driving oil pump 62 at its lower end and distributor 63 at its upper end. Another mating gear may drive generator 64. Oil pump 62 delivers oil upward along drive shaft 61 to the casing housing gear 60, from which it enters shaft 10 which serves as an oil main to deliver oil to bearings 11, 12, 13, 14, 15, and 16, and to wabbler 40 and the mechanism operably connecting pistons 30 therewith. Oil leaking past bearings 15 and 16 is drained back to sump 29 thru drain passage 27, and similar drains must be provided for the other bearings to relieve the load on their adjacent seals.

Chamber 81, which houses front counterweight 18, must also be drained to sump 29, the passage lying to one side of the cylinder shown in section in Fig. 1.

As is well-known, the reciprocating masses in an engine of this type produce an inertia couple of substantially constant magnitude, rotating with shaft 10. A centrifugal couple of the same magnitude must be provided to oppose this piston inertia couple. Counterweight 18 is provided to help produce this balancing couple, and the rear counterweight may be had by making valve 50 staticly unbalanced by the correct amount, so that its unbalanced centrifugal force will be in the same plane and in the opposite direction to that of counterweight 18.

It is obvious that wristpins 37 may have larger bearing area than possible if the crosshead portion of piston members 30 were of the smaller diameter of pistons 31.

Contracting ring 82 is loosely held in cup 83, clamped between power cylinder sleeve 32 and compressor cylinder sleeve 34, and effectively locking the sleeves in their respective cylinders. Contracting ring 82 has a scraping action to remove excess oil from the skirt of piston 31, preventing the oil from getting into ports 58, 59, and 71, and helping to seal against leakage of the gases into the wabbler casing.

Having thus described the invention, it is clear that the objects thereof as stated have been attained. While a particular embodiment of the invention has been described, it is understood that changes may be made in the construction and in the arrangement of the various parts without departing from the spirit or scope of the invention as expressed in the following claims.

I claim:

1. A two-stroke internal combustion engine comprising a shaft, a group of cylinders parallel to and spaced about said shaft, pistons operable in said cylinders, means operably connecting said pistons to said shaft, exhaust ports in the walls of said cylinders and overrun by said pistons, one set of intake ports opening (on the "downward" stroke of said pistons) later than said exhaust ports, another set of intake ports opening (on the "downward" stroke of said pistons) earlier than said exhaust ports, and means comprising a single valve rotating with said shaft for delaying the effective opening of the last-mentioned set of intake ports in all of said cylinders until after said exhaust ports have opened.

2. In a two-stroke internal combustion engine comprising a shaft, power cylinders parallel to said shaft, compressor cylinders each coaxial with one of said power cylinders, piston members each having a power piston operable in one of said power cylinders and a compressor piston operable in one of said compressor cylinders, and mechanism operably connecting said piston members with said shaft: exhaust and intake ports in the walls of said power cylinders, said ports of such relative height that some of said intake ports open earlier and close later than said exhaust ports when overrun by said power pistons, ports in said compressor cylinders, a single rotary assembly including said shaft and a rotary valve controlling inlet and discharge of the working medium thru said compressor ports, and another rotary valve delaying the effective opening of said intake ports until after said exhaust ports have been opened by said power pistons.

3. A two-stroke internal combustion engine comprising, in combination, a shaft, power cylinders parallel to said shaft, compressor cylinders of larger bore than said power cylinders and each one coaxial with one of said power cylinders, piston members each having a power piston operable in one of said power cylinders and a compressor piston operable in one of said compressor cylinders, mechanism operably connecting said pistons with said shaft, exhaust ports and inlet ports in the walls of said power cylinders and overrun by said power pistons in the order stated on the "upward" strokes of said pistons, and a rotary valve assembly including said shaft and controlling flow of the working medium into and out of said compressor cylinders and delaying the effective opening of said inlet ports until after said power pistons have opened said exhaust ports.

4. A two-stroke internal combustion engine comprising, in combination, a shaft, cylinders parallel to said shaft, pistons operable in said cylinders and operably connected to said shaft, exhaust and inlet ports in the walls of said cylinders, some of said inlet ports being more distant from bottom center position of said pistons than said exhaust ports, means for supplying the working medium to said cylinders under pressure, and a single rotary valve rotating with said shaft and delaying the effective opening of said inlet ports until after said exhaust ports have been opened by said pistons.

LEE OLDFIELD.